Figure 1:
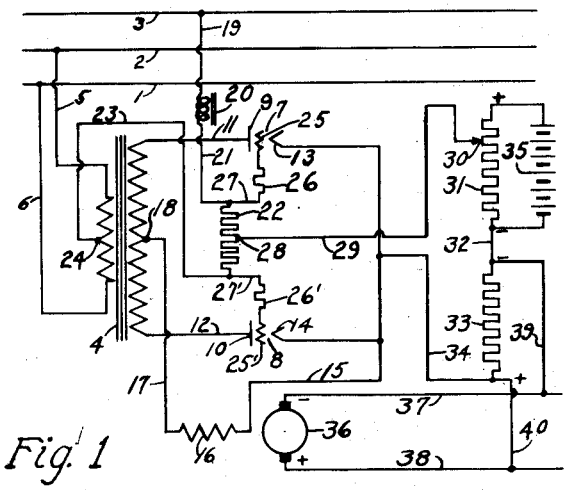

April 11, 1939.    R. RANSON    2,154,354

REGULATOR

Filed July 1, 1937

Inventor
RUSSELL RANSON
by
Attorney

Patented Apr. 11, 1939

2,154,354

UNITED STATES PATENT OFFICE 2,154,354

REGULATOR

Russell Ranson, Durham, N. C.

Application July 1, 1937, Serial No. 151,535

3 Claims. (Cl. 171—312)

This invention relates to electronic tube regulators and more particularly to voltage regulators of the electronic tube type for direct current generators, torque and/or speed regulators for direct current motors and the like wherein the field winding, for example, is excited or energized from an alternating current source of supply.

The introduction of amplifying means such as vacuum tubes in regulator circuits of the electronic tube type in order to obtain a high degree of sensitivity is undesirable since it complicates the circuit, adds to the cost of the regulator and decreases its reliability. With a view toward reducing the number of tubes in the regulator circuit and still obtaining the desired sensitivity of control, it has heretofore been proposed to utilize a periodic potential of peaked wave form in exciting the grid of the rectifying tubes. The circuits whereby this wave form has been obtained have, however, been open to certain objections in that they are not capable of utilizing the wave form to obtain maximum sensitivity and regulator precision, are more or less complicated in construction and design, and are not adapted for certain types of direct current machinery or circuits.

An object of the present invention, therefore, is to provide a regulator circuit for electronic tube regulators which incorporates a minimum number of vacuum tubes and which at the same time possesses extremely high sensitivity and regulatory precision, is simple in construction and design and has a relatively small number of component parts.

Another object is to provide a regulator which may be easily adjusted to regulate for any desired condition over a wide range.

Another object is to provide a regulator, the operation and regulatory precision of which is not affected by variations in voltage and frequency of the alternating current supply over a range normally present in the actual operation of the regulator.

With the foregoing and other objects and advantages in view, the invention consists in the preferred construction and arrangement of circuits and component parts of the latter which will be more fully hereinafter described and claimed.

In practicing my invention, I energize the field winding, for example, of a dynamo-electric machine from an alternating current source of supply through grid-controlled electronic tubes in a manner such that a full wave rectifying action is obtained. It is preferred to use tubes of the gas or vapor-filled variety, since such tubes embody characteristics which permit utilization to the best advantage of the rectifying characteristics in regulators of the type under consideration. To effect the necessary control of the rectifying tubes, I utilize an improved form of grid-potential phase-shifting circuit which allows a variable indicating direct current voltage to be superimposed on a base alternating-current grid-potential. This base alternating-current grid-potential has certain properties or characteristics upon which depend the sensitivity and regulatory precision of the invention. One of these properties is the phase position of the grid-potential in respect to the plate or anode potential, the selection of this position and reasons therefor being more fully hereinafter explained, and another property is that the wave form of the potential is peaked for the purpose of effecting a greater effective phase shift through the superimposition of a given indicating direct current voltage. The indicating direct current voltage is derived from the dynamo machine which is being regulated, and it controls the rectifying tubes in a manner such that the desired conditions of the dynamo machine are maintained. A standard reference potential is connected in direct opposition to the direct current generator armature potential and the difference between the standard reference potential and the generator armature potential gives the indicating direct current voltage. In the case of torque regulators for direct current motors, as well as other types of regulators, the indicating direct current voltage may be derived from a measure of the armature current such as the voltage drop across a resistor in series with the armature, or across a series field winding.

Figure 2:
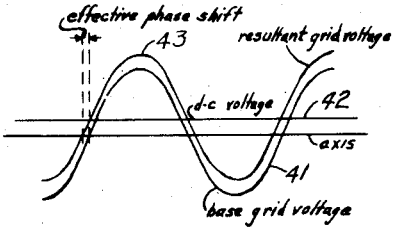
Figure 3:
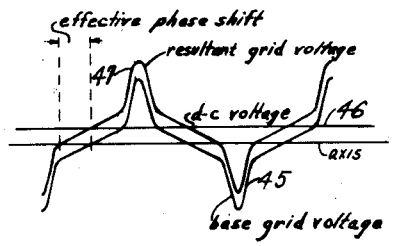
Figures 4A, 4B:
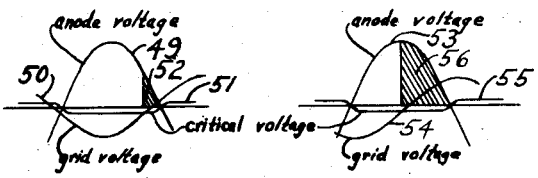
Figure 5:
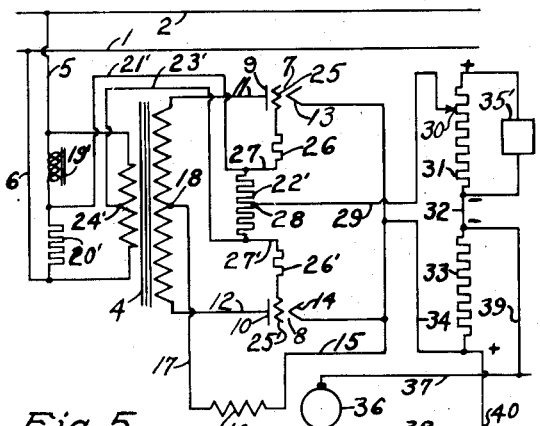
Figure 6:
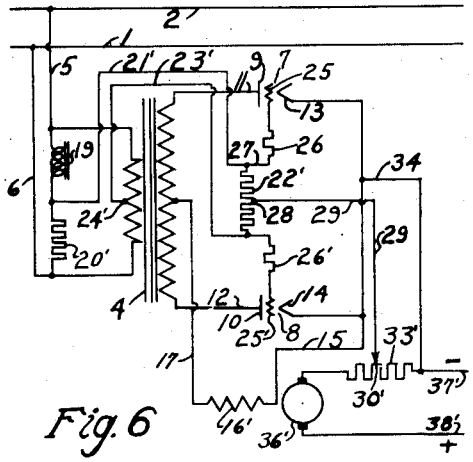

In the drawing:

Figure 1 is a diagram illustrating circuits and coacting apparatus arranged in operative relation in accordance with one form of my invention to regulate the voltage of a direct current generator, the power supply being three phase-alternating current;

Figure 2 is a wave diagram representation of the resultant grid-potential wave obtained from an indicating direct current voltage superimposed upon a base-alternating current grid-potential having a wave form which is not peaked, and Figure 3 is a view similar to Figure 4 but showing a peaked wave form obtained by superimposing the indicating direct current voltage upon a base alternating grid-potential in accordance with the features of my invention and showing the greater effective phase shift obtained through the use of a wave form of this type;

Figures 4a and 4b are wave diagram representations of the anode voltage, the grid-voltage and the critical voltage of a grid controlled gas-filled electron device as utilized by the regulating system of my invention, showing how the magnitude of the current furnished to the dynamo electric machine is controlled by shifting the grid voltage so that it becomes more positive than the critical voltage at a certain time during the cycle determined by the desired magnitude of current furnished, a comparison between these figures showing under what conditions of relative phase position the control of the tube will be more sensitive;

Figure 5 is a diagrammatic representation of circuits and apparatus in accordance with the features of the present invention arranged to regulate the voltage of a direct current generator, the power supply being single-phase alternating current; and Figure 6 is a view similar to Figure 5 but showing the regulator operating to regulate the torque of a direct current motor.

Referring to the drawing in detail, the regulating system shown in Figure 1 is adapted to maintain constant the voltage between conductors 37 and 38, which are energized by the direct current generator 36. The generator is provided with an exciting field winding 16 which is energized from a three-phase alternating-current power source represented by conductors 1, 2, and 3. The energization of the exciting field winding 16 from the alternating current source is effected through transformer 4, which is energized by one phase of the alternating current source through conductors 5 and 6, and the controllable electronic rectifier tubes 7 and 8.

These two tubes are connected for full wave rectification in a manner which is well known to those skilled in the art. The rectifying function of the tube depends upon its inherent valve-like action in that current may pass from anode to cathode when the anode is at a positive potential with respect to the cathode, but current will never pass from cathode to anode. Accordingly, when the upper end of the secondary winding on transformer 4 is at a positive potential, current will pass through conductor 11 to the anode 9 of tube 7, through the tube to cathode 13, through conductor 15 to and through the field 16 of the dynamo-electric machine. From the field 16 the current returns through conductor 17 to the midtap 18 of transformer 4, thereby completing the circuit.

During the next half cycle when the lower end of the secondary winding on transformer 4 is at a positive potential, tube 7 will not pass current because its anode 9 is negative in respect to the cathode 13. However, tube 8 will pass current because its anode 10 is at a positive potential in respect to the cathode 14. Therefore, current passes from the lower end of the secondary of transformer 4, through conductor 12 to the anode 10 of tube 8, through the tube to cathode 14, through conductor 15 to and through the field 16 of the dynamo electric machine. From the field 16 the current returns through conductor 17 to the midtap 18 of transformer 4, thereby completing the circuit. It will be recognized that regardless of which tube passes current, or which end of the secondary of transformer 4 is at a positive potential, the current through field winding 16 will always be in the same direction; that is, from conductor 15, through the field 16, to conductor 17.

The control of tubes 7 and 8 is effected through the medium of a particular arrangement of grid control apparatus. The circuit from the grid 25 of tube 7 to the cathode 13 of tube 7 is composed of grid protective resistor 26, conductor 27, the upper half of resistor 22, midtap 28 conductor 29 to resistor 31 at the adjustable tap 30, resistor 31, conductor 32, resistor 33 and conductor 34 to cathode 13. The circuit from the grid 25' of tube 8 to the cathode 14 of tube 8 is composed of grid protective resistor 26', conductor 27', the lower half of resistor 22, midtap 28, conductor 29 to resistor 31 at adjustable tap 30, resistor 31, conductor 32, resistor 33 and conductor 34 to cathode 14.

In the arrangement shown, each of the grids 25 and 25' of the grid-controlled rectifier tubes has impressed upon it a wave of alternating current voltage made up of two components. The first component is an alternating-current voltage of peaked wave form but symmetrical about the time axis. This voltage is the resistance drop through half of resistor 22 due to current flowing through the circuit consisting of conductor 19 connected to conductor 3 of the three phase alternating current supply, partially saturated reactor 20, conductor 21, resistor 22 and conductor 23, the latter being connected to the primary winding of transformer 4 at tap 24. By the proper design reactor 20 partially saturates when the voltage impressed on the reactor nears its maximum instantaneous value. When the reactor becomes more nearly saturated its impedance decreases so that the current flow increases still more and further saturates the device. After the instantaneous value of impressed voltage passes its peak and begins to decrease, the reactor will become less saturated and regain its higher value of impedance. It will be recognized by those skilled in the art that the current through the reactor will vary with time so that a peaked wave shape results. Since resistor 22 and reactor 20 are connected in series relationship, the same current that passes through reactor 20 will pass through resistor 22, and the current through resistor 22, as a function of time will also result in a peaked wave shape. Since there is a linear relation between the current through resistor 22 and the voltage drop across the latter or any part thereof, it follows that the voltage drop across either half of resistor 22 will be of the desired peaked wave form.

The second component of the alternating current voltage which is impressed on the grids 25 and 25' of tubes 7 and 8 respectively is a direct current voltage component, the magnitude and the polarity of which depends upon the terminal voltage of generator 36. Resistor 33 is connected by means of conductors 39 and 40 to conductors 37 and 38, which are energized from the generator 36. Resistor 31 is connected across the constant voltage source 35, which is indicated as a battery. It will be realized that any constant voltage direct current source may be used, including a rectified constant-voltage alternating-current source. Resistors 31 and 33 are connected in such a manner by conductor 32 that their voltages are in direct opposition, this being a well known means of obtaining a voltage differential. The voltage difference between conductor 29, connected to resistor 31 at the adjustable tap 30, and conductor 34 will be the difference between the voltage generated by generator 36 and that portion of the constant direct current voltage between conductor 32 and adjustable tap 30. The portion of the constant direct current voltage between conductor 32 and the adjustable tap 30 may be termed the reference voltage. Since the tap 30 is adjustable this reference voltage may be adjusted to any desired value up to the full voltage across resistor 31. It will be seen that this feature provides an adjustment of the generator voltage for which the device will regulate. Since that part of the circuit between conductor 29 and conductor 34 through tap 30, part of resistor 31, conductor 32 and resistor 33 is common to the grid circuits of both tube 7 and tube 8, any direct current voltage between conductor 29 and conductor 34 will be superimposed on the grid circuits of both tube 7 and tube 8. This direct current voltage may be of either polarity.

The effect of superimposing a direct current voltage on an alternating current voltage is to displace the alternating current voltage in a direction at right angle to the time axis so that an alternating current voltage which was originally symmetrical with respect to the time axis will no longer be symmetrical with respect to the time axis. Figure 2 shows this displacement. The original alternating current voltage or the base grid voltage is shown as 41, the direct current voltage is 42 and the voltage which results from superimposing 42 on 41 is shown as the resultant grid voltage 43. The effective shift of the grid voltage forward so far as the control of the rectifying tubes is concerned is also shown. The base grid voltage 41 is represented as an alternating current voltage which is not particularly peaked.

Figure 3 represents the superimposition of the same magnitude of direct current voltage 46 on a base grid voltage 45 which has a peaked wave shape. The resultant grid voltage 47 is again displaced from the time axis. The property of this resultant grid voltage which makes it desirable to use the peaked wave shape is that the grid voltage has effectively been shifted a great deal more than was the case when the less peaked base grid voltage was used. Since the effective phase shift is used to control the rectifying tubes, it is highly desirable that a large effective phase shift result from the superimposition of a small magnitude direct current voltage on the grid circuit in order that the regulator be highly sensitive to small changes in the voltage of generator 16. It will be recognized that the actual peak of the grid voltage wave is not of primary importance, but a wave of such shape also has a relatively flat portion in the wave ahead of the peak and it is this relatively flat portion which is utilized in the present invention in obtaining a large effective phase shift. Also, it will be recognized that that the superimposition of the direct current voltage in a manner such that it adds to the positive half cycles tends to make the wave shape of the resultant grid voltage less peaked. This, however, is unimportant because, as stated above, there is no desire to make use of the peak of the wave as such.

The control characteristics of grid-controlled gas-filled rectifier tubes is illustrated in Figures 4a and 4b. When the grid voltage 50 becomes more positive than the critical voltage 51, which depends upon the tube used and the anode voltage 49, the tube will begin passing current, indicated by the shaded area 52 under the anode voltage wave 49, and will pass current during the remaining half cycle regardless of the grid potential after the tube begins to pass current. If the alternating current grid voltage crosses the critical voltage or becomes more positive than the critical grid voltage sooner in the cycle, current will be passed for a longer period or the magnitude of the current will be greater. Those skilled in the art are well aware of the manner of controlling the current rectified by this type of tube by shifting the grid voltage.

The magnitude of current passed by the tube over a period of time depends not only upon the time of passing current but also the instantaneous magnitude of current during each interval of time. That is to say, by magnitude of current is usually meant the root mean square value of current. Again, the shaded area 52 under the anode voltage wave 49 may be used to indicate the magnitude of current passed. If the tube is operating under conditions as shown in Figure 4a, a small shift in the phase position of the grid voltage will result in only a very small change in current passed because the instantaneous magnitude of current is small. If on the other hand, the tube is operating under the conditions of Figure 4b, the same small shift in the phase position of the grid voltage 54 will result in a large change in current 56 passed because the instantaneous magnitude of current is large. The maximum change in current passed by the tube for a given phase shift of grid voltage will occur if the phase position of the grid voltage 54 is such that it crosses the critical voltage 55, or becomes more positive than the critical voltage, at a time when the anode voltage 53 is at its peak or maximum value. The tube is most sensitive to control under these conditions. While the grid voltages 50 and 54 as represented in Figure 4a and Figure 4b respectively are not shown as peaked voltage waves, a peaked voltage wave will have the same ability to control the tube.

By using a peaked base grid voltage wave to obtain a very large effective phase shift from the superimposition of a small resultant direct current voltage on the grid circuit and by placing the base grid voltage in such a phase position as described above so that the rectifier tubes are most sensitive to control, a very sensitive regulator results. It has been explained how the peaked base grid voltage wave form is obtained. The correct phase position of this voltage is obtained by the proper selection of the position of tap 24 on the primary winding of transformer 4.

In the operation of the complete regulating system shown by Figure 1, when the voltage across conductors 37 and 38 connected to the armature of the direct current generator 36 is of the normal or desired value, the voltage across resistor 33 is somewhat less than the reference voltage across that part of resistor 31 from conductor 32 to adjustable tap 30. This voltage differential causes just sufficient shift of the phase position of the grid potential as described above with reference to Figures 4a and 4b to result in the correct value of excitation current being furnished the field 16 to maintain the normal or desired voltage across conductors 37 and 38.

Upon a rise in the regulated voltage between conductors 37 and 38, the voltage differential between the generated voltage and the reference voltage becomes less, or even may reverse polarity. This change in voltage differential causes an effective phase shift of the grid potential so that a lesser value of excitation current is furnished to the field 16 by the tubes 7 and 8, and the voltage between conductors 37 and 38 returns to the normal or desired value. In a similar manner, when the regulated voltage between conductors 37 and 38 drops below the normal or desired value, the voltage differential between the terminal voltage of generator 36 and the reference voltage increases and the grid potential is shifted in phase so that a greater value of excitation current is furnished to field 16 by the tubes 7 and 8, and the voltage between conductors 37 and 38 returns to the normal or desired value.

In Figure 1, the series circuit consisting of conductor 23 connected to the primary winding of transformer 4 at tap 24, resistor 22, conductor 21, self-saturating reactor 20, and conductor 19 connected to conductor 3 which represents the third pase of the three phase alternating current power supply, is used to obtain the peaked base grid potential wave form as described herein. If the alternating current power supply is single phase, the desired peaked base grid potential wave form may be obtained by replacing the above series circuit with the circuit shown in Figure 5, consisting of reactor 19' connected to conductor 5, resistor 20' connected to conductor 6, conductor 21' connected to the interconnection between reactor 19' and resistor 20', resistor 22' and conductor 23' connected to tap 24' on transformer 4. This last circuit is a phase-shifting circuit which is well known to those skilled in the art. The voltage across reactor 19' is practically 90 electrical degrees displaced from the voltage across resistor 20', and the vector sum of these two voltages is the voltage across the primary winding of transformer 4. The phase position of the voltage from the interconnection between reactor 19' and resistor 20' and the tap 24' on the primary winding of transformer 4 may be shifted over a wide range by selection of either reactor 19', resistor 20', or tap 24'. The desired phase position of the base alternating current grid potential is obtained by the proper selection of reactor 19', resistor 20' and tap 24'. The desired peaked characteristic of the base alternating current grid potential is obtained by designing reactor 19' so that it is self-saturating to the proper degree. With reactor 19' properly designed for partial saturation, the current through reactor 19' and resistor 20' will be of peaked wave form for the same reasons that the current through reactor 20 and resistor 22 in Figure 1 is of peaked wave form. Also the voltage wave form for the voltage across resistor 22', being connected by conductors 21' and 23' to the interconnection between reactor 19' and resistor 20' and tap 24' on the primary winding of transformer 4, will be peaked as desired.

In addition to the direct-current generator applications shown in Figure 1 and Figure 5, the regulating system of my invention may likewise be applied to the regulation of pull or tension furnished by a direct-current motor in such applications as wire drawing and the like. Such an application is shown in Figure 6, in which the direct-current motor is shown as 36', the field of the motor is 16' and the connections from the direct-current source of supply to the motor armature are shown as conductors 37' and 38'. The circuits and arrangements of apparatus are the same as in Figure 5 except adjustable tap 30, resistor 31, conductor 32, resistor 33, constant potential source 35, conductor 39 and conductor 40 are replaced by resistor 33' with adjustable tap 30'. Also, generator 36 is replaced by motor 36', generator field winding 16 by motor field winding 16', and generator armature connected conductors 37 and 38 by motor armature connected conductors 37' and 38'. These replacements are necessary because instead of super-imposing on the grid circuit of tubes 7 and 8 a direct-current potential which is the differential between the generated voltage and the reference voltage, in the case of the motor regulator the direct-current voltage drop across the series resistor 33' is super-imposed on the grid circuits of tubes 7 and 8 to control the current passed by these tubes.

In the operation of the regulating system shown in Fig. 6, when the pull or tension furnished by the direct-current motor 36' is normal or as desired, that portion of the direct-current voltage drop across resistor 33' between conductor 34 and tap 30' is superimposed on the grid circuit of tubes 7 and 8 in such a manner that the correct value of excitation current will be delivered to the field winding 16' by the tubes 7 and 8 to maintain the normal or desired pull or tension on the motor load.

If the pull or tension is increased above the normal or desired amount, the motor armature current will increase, thereby causing a higher direct-current voltage to be superimposed on the grid circuit of tubes 7 and 8. This effectively shifts the phase of the grid potential so that the current delivered by tubes 7 and 8 to field winding 16' of motor 36' is increased, and the speed of the motor is reduced, thereby permitting the pull or tension furnished by the motor to decrease. In a similar manner, if the pull or tension is decreased below the normal or desired amount, the lesser armature current causes a lesser direct-current voltage to be superimposed on the grid circuits of tubes 7 and 8. This results in a lesser current delivered by tubes 7 and 8 to field winding 16' of motor 36', the motor speed increases and the tension returns to normal. The pull or tension for which the regulator regulates may be adjusted by adjusting connection 30' on resistor 33'.

It will be recognized by those skilled in the art that either the three phase alternating current power supply and the associated apparatus and combinations of circuits or the single phase alternating current power supply and associated apparatus and combinations of circuits may be used in any application.

It will be recognized also that in those applications which use a constant potential voltage for reference so that a voltage differential might be obtained, any constant voltage might be used although a battery is used in Figure 1 for illustration. In Figure 5 apparatus 35' represents any other form of constant potential. Included among other constant potential sources is a constant potential which is obtained by rectifying, and filtering if necessary, a constant alternating potential source.

It will further be recognized that mid-tapped resistor 22 in Figure 1 or mid-tapped resistor 22' in Figure 5 and Figure 6 may be replaced by any mid-tapped impedance which has a linear voltage-current characteristic, including a transformer with a mid-tapped secondary.

It will still further be recognized that resistor 33' in Figure 6 may be replaced by any series winding of direct-current motor 36' across which there is a voltage drop indicative of the current flowing into the armature of direct-current motor 36'.

While I have shown and described certain specific embodiments of my invention, I am fully aware that many further modifications thereof are possible. My invention, therefore, is not to be restricted except insofar as is necessitated by the prior art and by the scope of the appended claims.

I claim:

1. In a system for regulating a direct current circuit having a controlling element such as an excited field winding or the like energized from an alternating current source of potential, an electronic rectifying tube having a grid element, a circuit connecting said grid element with the alternating current source, means in said latter circuit functioning to impress on said grid circuit a base alternating current potential having a wave form with a gradual slope along the time axis before the peak of the wave, said means including an impedance across which the voltage varies linearly with the current and a reactor proportioned to saturate so as to result in a current wave having a gradual slope along the time axis, means for indicating a deviation of the voltage being regulated from a predetermined value, and another circuit directly connecting the grid circuit of said tube with the circuit being regulated through said latter means whereby there is superimposed upon the base alternating current potential a direct current component resulting in a shift of the grid potential in a direction at right angles to the time axis but causing in effect a relatively great phase shift along the time axis due to a change in the terminal voltage of the circuit being regulated, the relatively great effective phase shift resulting from the use of the gradual sloped portion of the base alternating current grid potential before the peak.

2. In a system for regulating a direct current circuit having a controlling element such as an excited field winding or the like energized from an alternating current source of potential, full wave rectifying means including a plurality of electronic tubes each having a grid element, a circuit connecting said grid elements with the alternating current source, means in said latter circuit functioning to impress on said grid circuit a base alternating current potential having a wave form with a gradual slope along the time axis before the peak of the wave, said means including an impedance across which the voltage varies linearly with the current and a reactor proportioned to saturate so as to result in a current wave having a gradual slope along the time axis, means for indicating a deviation of the voltage being regulated from a predetermined value, and another circuit connecting the circuit being regulated with the grid circuit through said latter means, said latter circuit being tapped into said impedance, whereby there is superimposed upon the base alternating current potential a direct current component resulting in a shift of the grid potential in a direction at right angles to the time axis but causing in effect a relatively great phase shift along the time axis due to a change in the terminal voltage of the circuit being regulated.

3. In a system for regulating a direct current circuit having a controlling element such as an excited field winding or the like energized from an alternating current source of potential, full wave rectifying means including a pair of electronic tubes each having a grid element, a circuit connecting said grid elements with the alternating current source, means in said latter circuit functioning to impress on said grid circuit a base alternating current potential having a wave form with a gradual slope along the time axis before the peak of the wave, said means including a serially connected resistor and reactor, the latter being proportioned to saturate so as to result in a current wave having a gradual slope along the time axis, an adjustable reference voltage connected to said direct current circuit for indicating a deviation of the voltage being regulated from a predetermined value, and another circuit connecting the circuit being regulated with the grid circuit through said reference voltage, said latter circuit being tapped into said resistance, whereby there is superimposed upon the base alternating current potential a direct current component resulting in a shift of the grid potential in a direction at right angles to the time axis but causing in effect a relatively great phase shift along the time axis due to a change in the terminal voltage of the circuit being regulated.

RUSSELL RANSON.